No. 660,038. Patented Oct. 16, 1900.
W. L. WRIGHT & A. J. HACKLER.
SEED PLANTER.
(Application filed Apr. 27, 1900.)
(No Model.)
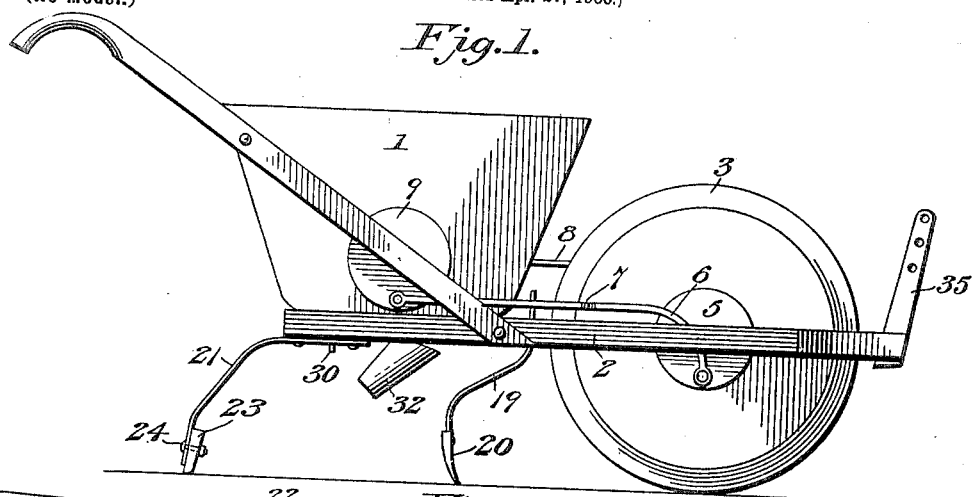
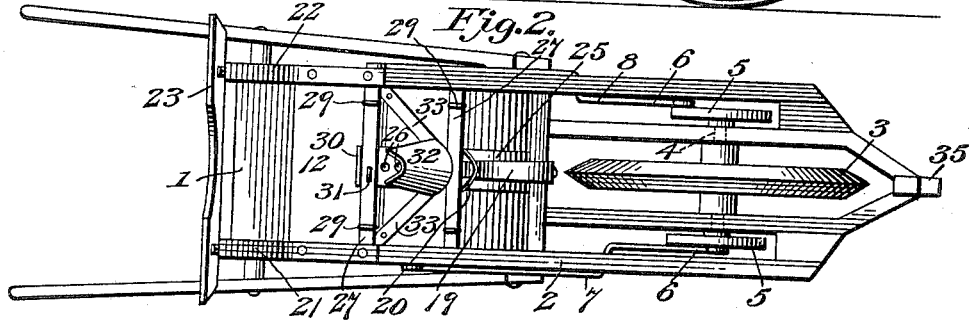
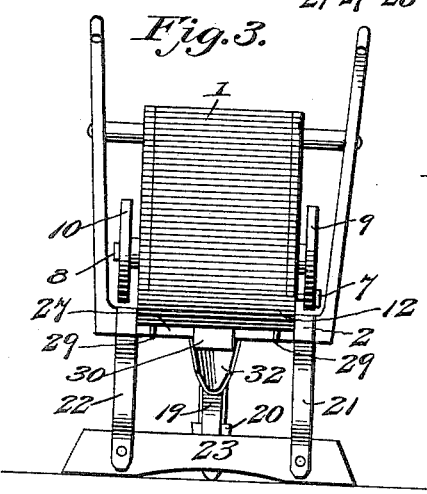
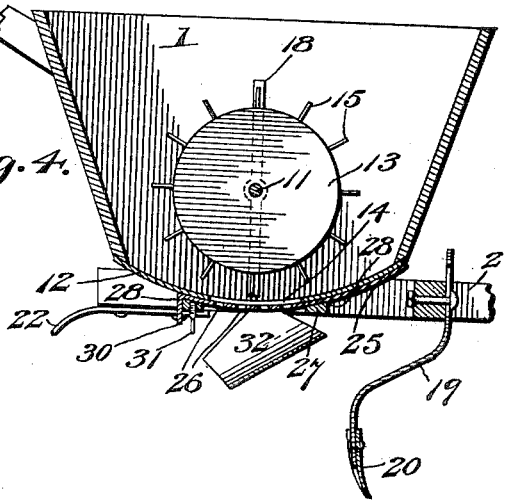
Witnesses
Edwin G. McKee
Latus G. Julihn
William L. Wright and
Andrew J. Hackler
Inventors
By
Attorney
THE NORRIS PETERS CO., PHOTO-LITHO., WASHINGTON, D. C.

UNITED STATES PATENT OFFICE.

WILLIAM L. WRIGHT AND ANDREW J. HACKLER, OF BETTIE, TEXAS.

SEED-PLANTER.

SPECIFICATION forming part of Letters Patent No. 660,038, dated October 16, 1900.

Application filed April 27, 1900. Serial No. 14,633. (No model.)

*To all whom it may concern:*

Be it known that we, WILLIAM L. WRIGHT and ANDREW J. HACKLER, citizens of the United States, residing at Bettie, in the county of Upshur and State of Texas, have invented a new and useful Seed-Planter, of which the following is a specification.

Our invention relates to improvements in seed-planters, and more particularly to the construction and arrangement of the mechanism for properly regulating the feed.

The object in view is to construct a planter with special reference to the planting of cotton or like seeds and equipped with a simple and convenient device for regulating the quantity of seeds dropped from the hopper immediately behind the furrow-opener; and the invention consists in the provision of a feed-regulator of novel construction, combined with a feed-chute related to the regulating-slide in a manner to compel all of the seeds to be dropped from the same point in order to secure uniformity in the line of seeds deposited in the furrow by the planter.

The invention consists in certain other features of construction and arrangement, all of which will hereinafter more fully appear and will be illustrated in the accompanying drawings and defined in the appended claim.

In said drawings, Figure 1 is a side elevation of our planter complete. Fig. 2 is a bottom plan view thereof. Fig. 3 is a rear elevation, and Fig. 4 is a longitudinal sectional view through the hopper and its connected parts.

Referring to the numerals of reference employed to designate corresponding parts and structural peculiarities in the several views, 1 indicates the hopper of our planter, mounted upon a frame 2, within which is journaled, adjacent to its front end, the usual supporting and actuating wheel 3. Upon the shaft 4 of the wheel 3 are keyed or otherwise mounted a pair of crank-disks 5, eccentrically connected to the downturned ends 6 of pitmen 7 and 8, the rear ends of which pitmen are eccentrically connected to crank-disks 9 and 10, mounted upon the agitator-shaft 11, which pierces the hopper 1 concentric with the curved bottom wall 12 of the latter. 13 indicates a feed-wheel mounted upon the shaft 11 directly over an elongated feed-opening 14 in the hopper-bottom 12 and provided with a peripheral series of irregularly-alined spines or pins 15, which are designed to insure the proper feeding of the seeds through the seed-opening. The shaft 11 is additionally provided at opposite sides of the feed-wheel with radial agitating-arms 18, designed to effectually loosen the body of seeds within the hopper to prevent clogging of the feed-opening. Adjustably suspended from the frame 2 in front of the feed-opening is the shank 19 of the furrow-opener 20, and from the frame, to the rear of said opening and at opposite sides thereof, depend the shanks 21 and 22 of a transverse seed-coverer 23, detachably connected to the shanks by means of bolts 24 in order that when desired the coverer may be removed and shovel-plows or other similar implements may be substituted.

The construction thus far described, except as to the specific forms of some of the elements, is ordinary; but we shall now proceed to describe that particular structure which is employed for the accomplishment of the primary object of the invention.

Fitting close against the under side of the curved bottom 12 is a correspondingly-curved slidably-mounted feed-regulating plate 25, provided with a series of feed-openings 26 and retained in movable contact with the bottom 12 by transverse cleats 27, provided in their upper faces with recesses 28 for the reception of the plate and held in place as by staples or other suitable securing means 29, driven into the hopper from below. The regulating-plate is provided at its rear end with a depending stop-flange 30, which limits its movement and constitutes means for facilitating its adjustment. A set-screw or other retaining device 31 is passed through one of the cleats and bears against the regulating-plate in order to securely hold the latter in the desired position to bring any number of the feed-holes in the regulating-plate before the feed-opening 14 in the hopper-bottom.

Inasmuch as it is desirable that all of the seeds should be deposited from the same point of the machine, we provide an inclined feed-chute 32, substantially U-shaped in cross-section and having its upper end straddling the regulating-plate 25 adjacent to the front end of the opening 14 and having its lower or discharge end located immediately under the rear of said opening, so that as the seeds are dropped through the several feed-openings in the plate or slide they are projected into the feed-chute and are discharged from its lower end. The means for retaining the chute preferably comprises a pair of divergent arms 33, connected to the upper end of the chute at opposite sides of the regulating-plate and having their extremities bolted or otherwise secured to the bottom of the hopper.

In operation the seeds are placed within the hopper and the planter is drawn over the ground by draft-animals hitched by a clevis (not illustrated) to a clevis-post 35, extending upward from the front of the frame 2. The progress of the planter will effect the rotation of the supporting-wheel, which through the intermediate crank-disks and pitmen will rotate the agitator or feed-shaft to cause the agitation of the seed within the hopper. As the planter progresses the furrow-opener will properly open the ground and the seeds to be planted will be deposited from the discharge end of the feed-chute, after which the seeds will be covered by the coverer and the operation of planting will be completed. When it is desired to increase or diminish the feed, it is simply necessary to adjust the regulating-slide to present a greater or less number of feed-openings before the feed-slot 14 in the hopper-bottom, the slide being then secured in its adjusted position by screwing up the set-screw 31.

From the foregoing it will be observed that we have devised a simple and ingenious improvement in seed-planters which will effect the attainment of the several objects hereinbefore recited; but we do not wish to limit ourselves to the structural details defined. On the contrary, we reserve the right to effect such structural variations as may be comprehended within the scope of the appended claim.

What we claim is—

In a seed-planter, the combination with a frame, supporting-wheel, a hopper carried by the frame, feed mechanism within the hopper, and a crank-and-pitman connection intermediate of the feed mechanism and supporting-wheel, of a pair of transverse cleats secured to the under face of the hopper and provided with recesses in their upper sides, a curved regulating-slide received within the recesses of the cleats and provided with an angular end and with a series of feed-openings, a set-screw passed through one of the cleats and engaging the slide, and an inclined feed-chute straddling the regulating-slide, and divergent arms connected to the feed-chute at opposite sides of the slide and secured to the bottom of the hopper.

In testimony that we claim the foregoing as our own we have hereto affixed our signatures in the presence of two witnesses.

WILLIAM L. WRIGHT.
ANDREW J. HACKLER.

Witnesses:
J. A. DERRICK,
T. B. LITTELL.